United States Patent
Lawson et al.

(10) Patent No.: US 8,416,923 B2
(45) Date of Patent: Apr. 9, 2013

(54) METHOD FOR PROVIDING CLEAN ENDPOINT ADDRESSES

(75) Inventors: Jeffrey G. Lawson, San Francisco, CA (US); John Wolthuis, San Francisco, CA (US); Evan Mansfield Cooke, Cambridge, MA (US)

(73) Assignee: Twilio, Inc., San Francisco, CA (US)

( * ) Notice: Subject to any disclaimer, the term of this patent is extended or adjusted under 35 U.S.C. 154(b) by 193 days.

(21) Appl. No.: 13/167,548

(22) Filed: Jun. 23, 2011

(65) Prior Publication Data

US 2012/0207285 A1  Aug. 16, 2012

Related U.S. Application Data

(60) Provisional application No. 61/470,402, filed on Mar. 31, 2011, provisional application No. 61/357,937, filed on Jun. 23, 2010.

(51) Int. Cl.
*H04M 3/22* (2006.01)

(52) U.S. Cl.
USPC ..................................... 379/32.04

(58) Field of Classification Search ............... 379/32.04
See application file for complete search history.

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,223,287 B1 | 4/2001 | Douglas et al. |
| 6,269,336 B1 | 7/2001 | Ladd et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Creighton Smith

(74) *Attorney, Agent, or Firm* — Jeffrey Schox; Brian Van Osdol

(57) ABSTRACT

A method for providing clean endpoints including managing a collection of endpoints; testing communication of an endpoint of the collection of endpoints; and generating a cleanliness score for the endpoint according to results of the test. The method functions to create a metric that can be used to evaluate undesired communication activity and functionality of an endpoint. The method may be implemented by any suitable platform providing endpoint addresses to clients, which may include service providers, internet-telephony platforms, or any suitable entity. The method is preferably applied to telephony endpoints used in internet-telephony applications, but may be used in any suitable application.

28 Claims, 10 Drawing Sheets

U.S. PATENT DOCUMENTS

| | | |
|---|---|---|
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Strom et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,140,004 B1 | 11/2006 | Kunin et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Hensinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,962,644 B1 | 6/2011 | Ezerzer et al. |
| 8,081,958 B2 | 12/2011 | Soederstroem et al. |
| 8,126,128 B1 | 2/2012 | Hicks, III et al. |
| 2002/0006124 A1 | 1/2002 | Jimenez et al. |
| 2002/0077833 A1 | 6/2002 | Arons et al. |
| 2002/0126813 A1 | 9/2002 | Partovi et al. |
| 2003/0006137 A1 | 1/2003 | Wei et al. |
| 2003/0026426 A1 | 2/2003 | Wright et al. |
| 2003/0046366 A1 | 3/2003 | Pardikar et al. |
| 2003/0059020 A1 | 3/2003 | Meyerson et al. |
| 2003/0061404 A1 | 3/2003 | Atwal et al. |
| 2004/0071275 A1 | 4/2004 | Bowater et al. |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0010483 A1 | 1/2005 | Ling |
| 2005/0135578 A1 | 6/2005 | Ress et al. |
| 2005/0177635 A1 | 8/2005 | Schmidt et al. |
| 2005/0240659 A1 | 10/2005 | Taylor |
| 2005/0246176 A1 | 11/2005 | Creamer et al. |
| 2006/0015467 A1 | 1/2006 | Morken et al. |
| 2006/0143007 A1 | 6/2006 | Koh et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0070906 A1 | 3/2007 | Thakur |
| 2007/0070980 A1 | 3/2007 | Phelps et al. |
| 2007/0121651 A1 | 5/2007 | Casey et al. |
| 2007/0127703 A1 | 6/2007 | Siminoff |
| 2007/0133771 A1 | 6/2007 | Stifelman et al. |
| 2007/0192629 A1 | 8/2007 | Saito |
| 2007/0242626 A1 | 10/2007 | Altberg et al. |
| 2007/0265073 A1 | 11/2007 | Novi et al. |
| 2007/0291905 A1 | 12/2007 | Halliday et al. |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0165708 A1 | 7/2008 | Moore et al. |
| 2008/0232574 A1 | 9/2008 | Baluja et al. |
| 2008/0313318 A1 | 12/2008 | Vermeulen et al. |
| 2008/0317222 A1 | 12/2008 | Griggs et al. |
| 2009/0052437 A1 | 2/2009 | Taylor |
| 2009/0052641 A1 | 2/2009 | Taylor |
| 2009/0074159 A1 | 3/2009 | Goldfarb et al. |
| 2009/0089699 A1 | 4/2009 | Saha et al. |

| | | |
|---|---|---|
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0082513 A1 | 4/2010 | Liu |
| 2010/0088698 A1 | 4/2010 | Krishnamurthy |
| 2010/0142516 A1 | 6/2010 | Lawson et al. |
| 2010/0150139 A1 | 6/2010 | Lawson et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0176537 A1 | 7/2011 | Lawson et al. |
| 2011/0280390 A1 | 11/2011 | Lawson et al. |
| 2011/0283259 A1 | 11/2011 | Lawson et al. |
| 2011/0320550 A1 | 12/2011 | Lawson et al. |
| 2012/0036574 A1 | 2/2012 | Heithcock et al. |
| 2012/0281536 A1 | 11/2012 | Gell et al. |

FOREIGN PATENT DOCUMENTS

| | | |
|---|---|---|
| EP | 1464418 A | 10/2004 |
| EP | 1770586 A1 | 4/2007 |
| ES | 2134107 | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 | 4/2010 |
| WO | 2010101935 A | 9/2010 |
| WO | 2011091085 A | 7/2011 |

METHOD FOR PROVIDING CLEAN ENDPOINT ADDRESSES

CROSS-REFERENCE TO RELATED APPLICATIONS

This application claims the benefit of U.S. Provisional Application No. 61/357,937, filed 23 Jun. 2010, titled "METHOD FOR PROVIDING CLEAN TELEPHONE NUMBERS", and U.S. provisional Application No. 61/470,402, filed 31 Mar. 2011 titled "METHOD FOR PROVISIONING ENDPOINT ADDRESSES FOR TELEPHONY COMMUNICATION", which are both incorporated in their entirety by this reference.

TECHNICAL FIELD

This invention relates generally to the telephony field, and more specifically a new and useful method for providing clean endpoint addresses in the telephony field.

BACKGROUND

Telephone numbers have traditionally been items that people and businesses would possess for a long duration. At times, calls are made to a phone number that either are intended for the previous owner of the phone number, or sometimes a call would be received at a phone number that was intended for a similar phone number. Such wrong number dialings detract from the value of the phone number not only for the owner of the phone number, but also the caller that does not connect to the connection they expect. With the increase in telephony based internet services such as VoIP (Voice over Internet Protocol) numbers and other telephony based applications, phone numbers are cycling through more owners at an increasing rate. Not only phone numbers but other communication endpoints are seeing such usage. Similarly, instead of one endpoint for multiple people (either in a household or small business), people now are associated with multiple endpoints. In some cases, an endpoint address may only be used by an owner for less than a day. Such rapid use and recycling of endpoints results in "dirty" endpoints or endpoints that have incoming communication intended for the numerous previous owners. In particular, with the limited global addressing space of phone numbers (e.g., 10 numerical digits), dirty numbers are an increasing problem. Further complicating matters, today there is a higher diversity of usage environments in terms of networks, protocols, and applications; some endpoints do not work as reliably for all networks and protocols. Users may obtain a new endpoint only to discover that the endpoint is essentially unusable because of previous usage or network/protocol issues. Thus, there is a need in the telephony field to create a new and useful method for providing clean endpoint addresses. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
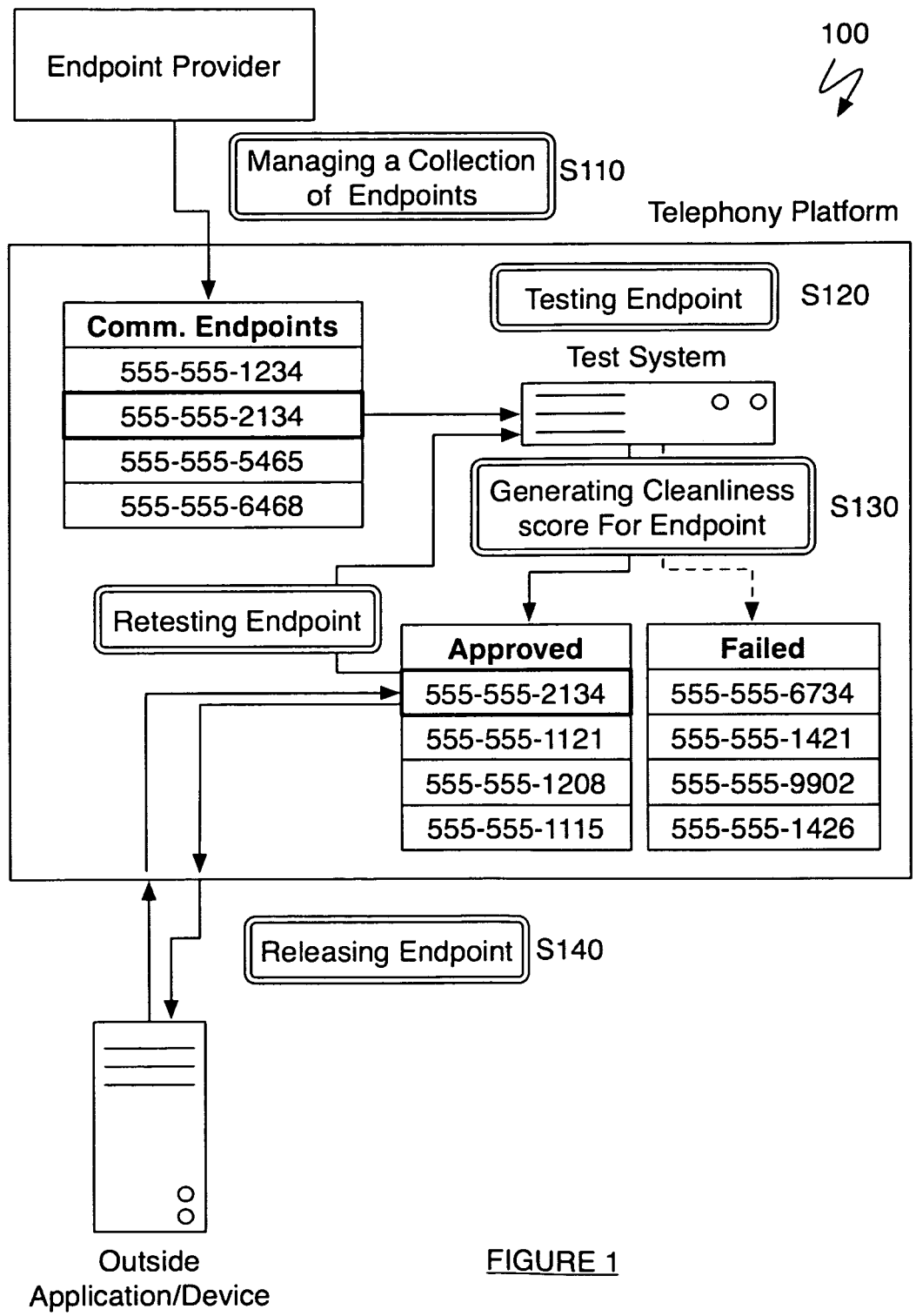
FIG. 1 is a schematic representation of a method of a preferred embodiment of the invention.
Figure 2:
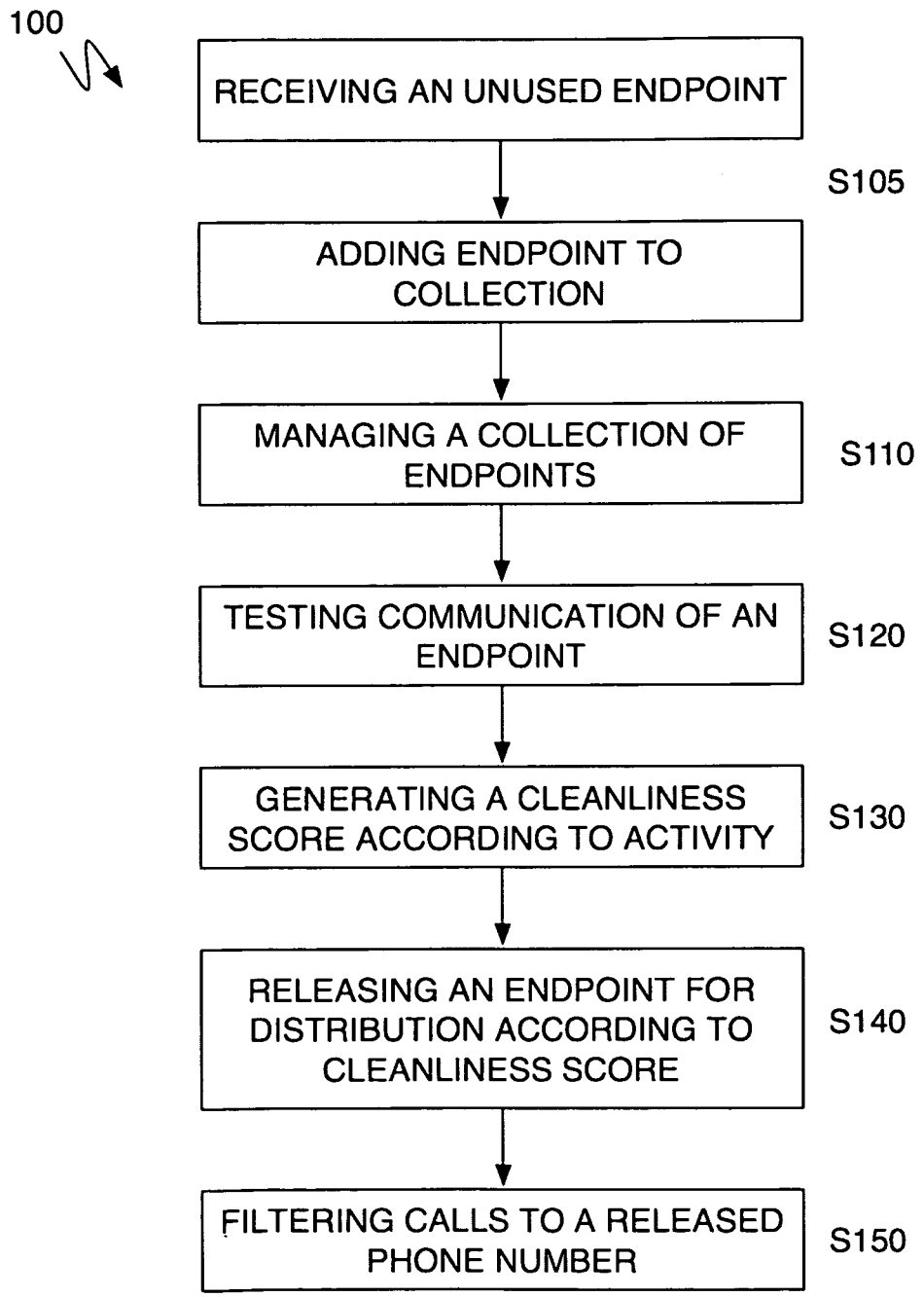
FIG. 2 is a flowchart representation of a method of a preferred embodiment of the invention.

As shown in FIG. 1, a method 100 for providing a clean endpoint address includes managing a collection of endpoints S110, testing communication of an endpoint of the collection of endpoints S120, and generating a cleanliness score for the endpoint according to results of the test S130. The method functions to create a metric that can be used to evaluate undesired communication activity and functionality of an endpoint. The method may be implemented by any suitable platform providing endpoint addresses to clients, which may include service providers, internet-telephony platforms, or any suitable entity. The method is preferably applied to telephony endpoints used in internet-telephony applications, but may be used in any suitable application. An endpoint owner may have a variety of different uses of an endpoint such as using the endpoint as a home phone number, a cell phone number, business phone number, VoIP numbers, telephony application phone number, a short message service (SMS) or multimedia messaging service (MMS) short code, IP address, email address or any suitable application of a communication endpoint address. Each of these applications preferably has varying requirements and impacts on the cleanliness of a phone number. A cleanliness score may have many uses including impacting the pricing of an endpoint, certifying an endpoint according to a cleanliness standard, categorizing types of endpoints, altering the routing of a communication, or informing past owners of miscalls or any suitable application. Testing a communication of an endpoint preferably includes the sub-steps of monitoring incoming communication activity of the endpoint and identifying undesired communication activity patterns S121 and/or testing functionality of communication between the endpoint and a network endpoint S122. Additionally, one embodiment of the method where managing the collection of endpoints includes managing a collection of quarantined endpoints may include releasing the endpoint for distribution according to the cleanliness score S140. Additionally or alternatively, a second embodiment of the method may include filtering calls to a distributed phone number according to the monitored activity when in quarantine S150. Steps S140 and S150 function to provide the endpoints for reuse and to actively prevent communications that are likely undesired communications as shown in FIG. 2. The method 100 is preferably implemented by a computer system connected to the PSTN (Public Switched Telephone Network) or any suitable telephony network, but may be integrated with any suitable communication infrastructure. In one embodiment, the method is integrated into a internet-telephony platform for assigning endpoints to applications such as the internet-telephony platform described in published U.S. Patent Application 2009/0252159, filed 2 Apr. 2009, and titled "SYSTEM AND METHOD FOR PROCESSING TELEPHONY SESSIONS" which is incorporated in its entirety by this reference.

Step S110, which includes providing a clean endpoint address includes managing a collection of endpoints, functions to have a plurality of endpoints maintained by an entity. An endpoint is preferably an address for a telephony application but may alternatively be any suitable communication address. The address is preferably reachable from a plurality of networks. The endpoint address may be a long code phone number, short message system short code, SIP address, email address, or any suitable communication address. The endpoint address is preferably capable of interfacing with a variety of communication protocols including short message service (SMS), voice calls, fax, multimedia messaging service (MMS), and/or any suitable communication protocol. The endpoint is preferably provided by a carrier, vendor, recycled from an unused endpoint within a platform, or any suitable source. The endpoints, such as phone numbers and short codes, are preferably globally name spaced, and furthermore there may be a limited number of addresses. The endpoints may alternatively, be created dynamically within a controlled namespace.

The endpoints may be in a plurality of states preferably including a quarantined state, released state, distributed state, and/or an inactive state. Endpoints in a quarantined state are preferably endpoints managed but awaiting testing before being released for distribution. In other words, there are no expected incoming communications (e.g., calls) as there is no entity responsible for responding to the communications. In the case of the telephony service provider, the quarantined phone numbers may be unassigned to any entity. In the case of an internet-telephony system provider, a quarantined phone numbers may be phone numbers not assigned to a customer but owned by the internet-telephony system. A collection of quarantined endpoints functions as an intermediary collection where the residual activity of a phone number can subside and information concerning the activity analyzed. Endpoints in a released state have preferably been tested and qualified for use by client and are awaiting to be distributed. Alternatively, endpoints may be distributed to users directly from a quarantined state. Endpoints in a distributed state (i.e., active state) have preferably been assigned to a user or client for use such as being assigned as a phone number for a customer. Endpoints in an inactive state were preferably endpoints that are no longer distributed (i.e., assigned to a client). Inactive endpoints are preferably added to the collection of quarantined endpoint at a suitable time. They may alternatively be retired or treated in any suitable manner. Any other state and transition between states may alternatively be used. The method 100 may be applied during any suitable state of an endpoint. For example, a cleanliness score may be generated while in a quarantine state and used in determining when and/or how to distribute the endpoints. As another example, the cleanliness score may be calculated or updated while in a distributed state, and used to actively route incoming communication.

Figure 3:
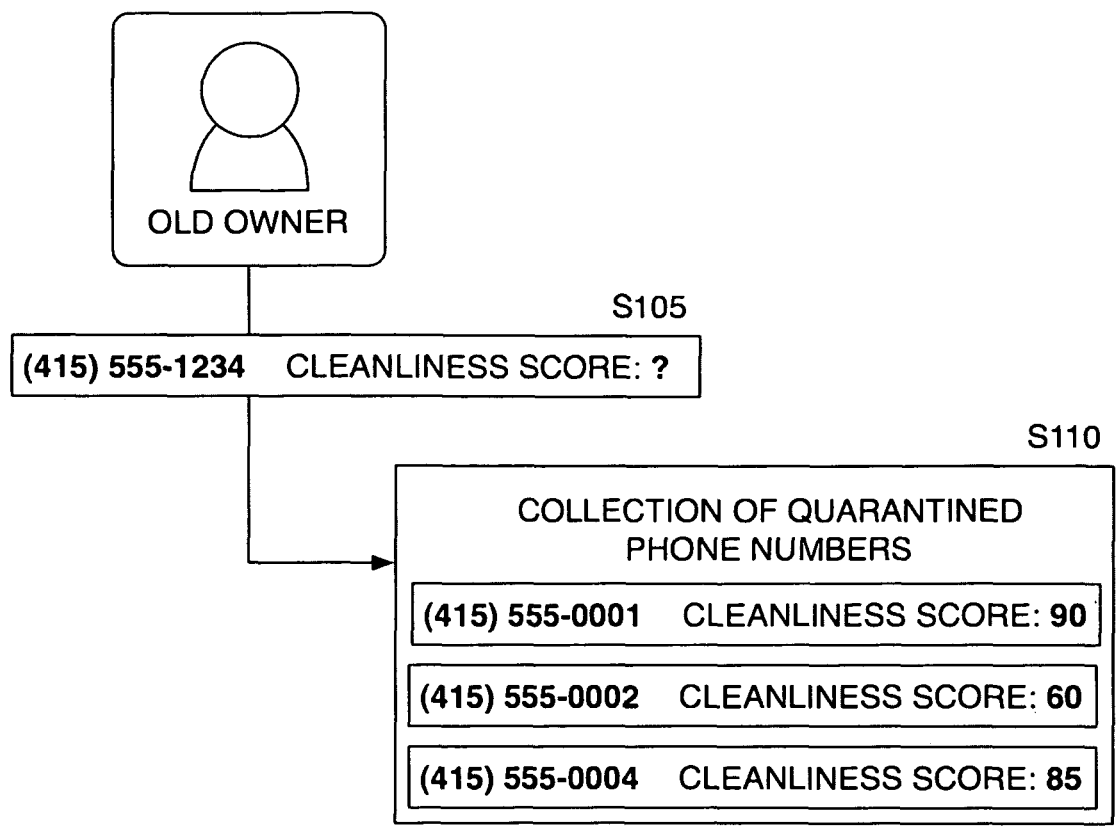
FIG. 3 is a detailed schematic representation of managing a collection of endpoints of a preferred embodiment of the invention.

The endpoints may be endpoints owned or managed by a telephone service provider or alternatively by an endpoint reseller such as an internet-telephony system provider. As shown in FIG. 3, the method 100 may additionally include receiving an unused endpoints and adding the endpoints to the collection of quarantined phone numbers S105. Step S105 functions to move previously used endpoints to the collection of quarantined endpoints, as opposed to directly offering the endpoint for customer use. Step S105 may additionally include storing contact information of a previous endpoint owner. When a endpoint is given up by a previous owner and added to the collection of quarantined endpoints S105, the previous owner can preferably leave contact information such as a permanent phone number, a mailing address, an email address, a website or any suitable place to redirect a communication. Such contact information is preferably used in Step S152 to redirect a wrong address communication.

Step S120, which includes testing communication of an endpoint of the collection of endpoints, functions to analyze use of the endpoint. Preferably the activity and/or the functionality of the endpoint are tested. The impacts of the history of the endpoint (e.g., who has used the number before), technical complications (e.g., network issues that break functionality), commercial value of a number, and/or optimal use of the endpoint (e.g., better for SMS or voice applications) may be analyzed in Step S120. Testing the endpoint preferably facilitates determining how "dirty" an endpoint address is. Here dirty describes the perceived quality of the endpoint address. The persistence of the history of the number (i.e., if the number is known and used by others in the world) and how the number functions are both attributes impacting the quality of a number. When a user is assigned an endpoint, the endpoint is preferably "clean" (and not dirty). A user typically desires to not receive incoming communications intended for a previous owner, and the user typically desires incoming and outgoing communications to be successfully completed. If the last use of an endpoint was for a popular service then the number may be very "dirty". Similarly, if network issues prevent successful communications in particular network conditions, then the endpoint is also preferably considered "dirty". The testing preferably analyzes characteristics of incoming communication by monitoring incoming communication activity of the endpoint and identifying undesired communication activity patterns S121. The testing preferably analyzes capability to perform communication by testing functionality of communication between the endpoint and a network endpoint S122.

The tests are preferably periodically performed, and they may be performed during any suitable state of the endpoint. For example, endpoints of a collection of quarantined endpoints are preferably tested over an extended period of time, and once the endpoints are distributed to clients, the endpoints are additionally tested while in use. Testing may be initiated automatically by a hosting platform (e.g., the entity that provisioned the communication endpoint) or alternatively, initiated b a request from the entity provisioned the communication endpoint. Test communication and/or sessions are preferably distinguishable from live production traffic. The test communication preferably has an identifying property such as a unique test ID or test signature. For voice or fax communication, a piece of meta-data such as caller-Id may be set or modified to indicate the communication is for testing purposes. For SMS, MMS, or fax, a part of the message body may have a special test string (preferably a string unlikely to appear in regular use). The tests preferably include tests similar to those described in Step S120. The types of and parameters of the test(s) can preferably be set so that targeted testing may occur. These could be automatically set based on the usage of the communication endpoint. If the test or multiple tests fail, the endpoint may be marked for upstream issue resolution, customer notified of error, a replacement communication endpoint automatically provisioned, or any suitable response made.

Figure 4:
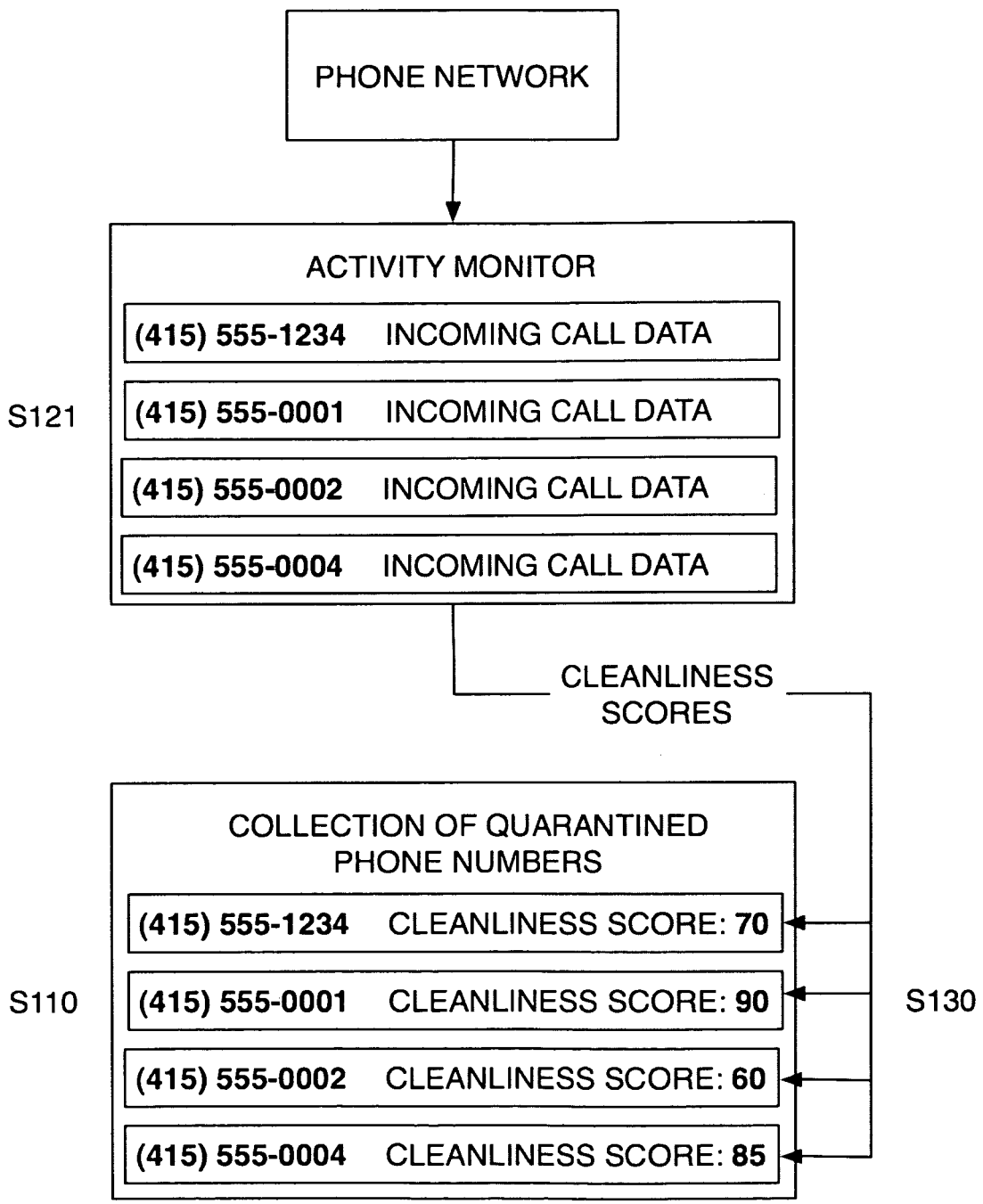
FIG. 4 is a detailed schematic representation of monitoring incoming communication activity of a preferred embodiment of the invention.

As a first alternative or additional variation, Step S121, which includes monitoring incoming communication activity of the endpoint and identifying undesired communication activity patterns, functions to analyze incoming communications to an endpoint. Preferably, communication activity of the endpoint is performed while the endpoint is in a quarantined state where all incoming communication would typically be undesired for future owners of the endpoint. As shown in FIG. 4, incoming communication requests to an endpoint are intercepted and analyzed. The incoming communication request will preferably receive a fast busy signal or not in service message as is commonly done for unregistered phone numbers. Any suitable response may be made depending on the type of endpoint. The activity of an endpoint will preferably subside as the endpoint is left inactive in the collection for a longer amount of time. The monitoring preferably includes recording the number and frequency of incoming communications. Incoming communications preferably includes incoming calls, telephony messages such as SMS (Short Message System) or MMS (Multimedia Messaging Service) messages, fax messages, or any suitable incoming telephony communication. Additionally, monitoring activity of a phone number preferably includes recording the caller ID of incoming communications, the area code or country code of incoming communications, analyzing temporal patterns of calls such the time of day incoming communications are often made, telephony message contents, or any suitable data of incoming communications. Such monitoring can preferably detect common sources of wrong number errors. For example, if the phone number was previously used for communicating to a particular country or if there is a particular area code that a previous owner often communicated with, such call patterns are preferably detected. A blacklist is preferably created for an endpoint based on the identified undesired communication activity patterns. This blacklist preferably includes specific endpoints or endpoint patterns that have a high probability of being undesired communication for a new owner of the endpoint. An endpoint pattern may be defined by an area code or country code of an endpoint, a host domain, message contents, time of an incoming communication, or any suitable pattern.

To pass a test for dirtiness, the endpoint preferably needs to receive undesired incoming messages below some threshold wherein the threshold is set at a suitable a number of undesired incoming communications. When in a quarantined state, an automated message may be assigned to endpoint and automatically played for all incoming communication to discourage future use of the endpoint, and quarantining the number for a period of time may clean the endpoint by being out of commission for a long duration of time. Alternatively, the endpoint may be monitored when in a distributed state. When in a distributed state desired activity and undesired activity is typically occurring. In one variation, differentiating desired communications from undesired communications may be accomplished by receiving a signal from a client who has been assigned the distributed endpoint (e.g., the user of a phone number). In a second variation, differentiating desired communications from undesired communications may be accomplished by algorithmically analyzing the attributes and/or content of a communication.

Figure 5:
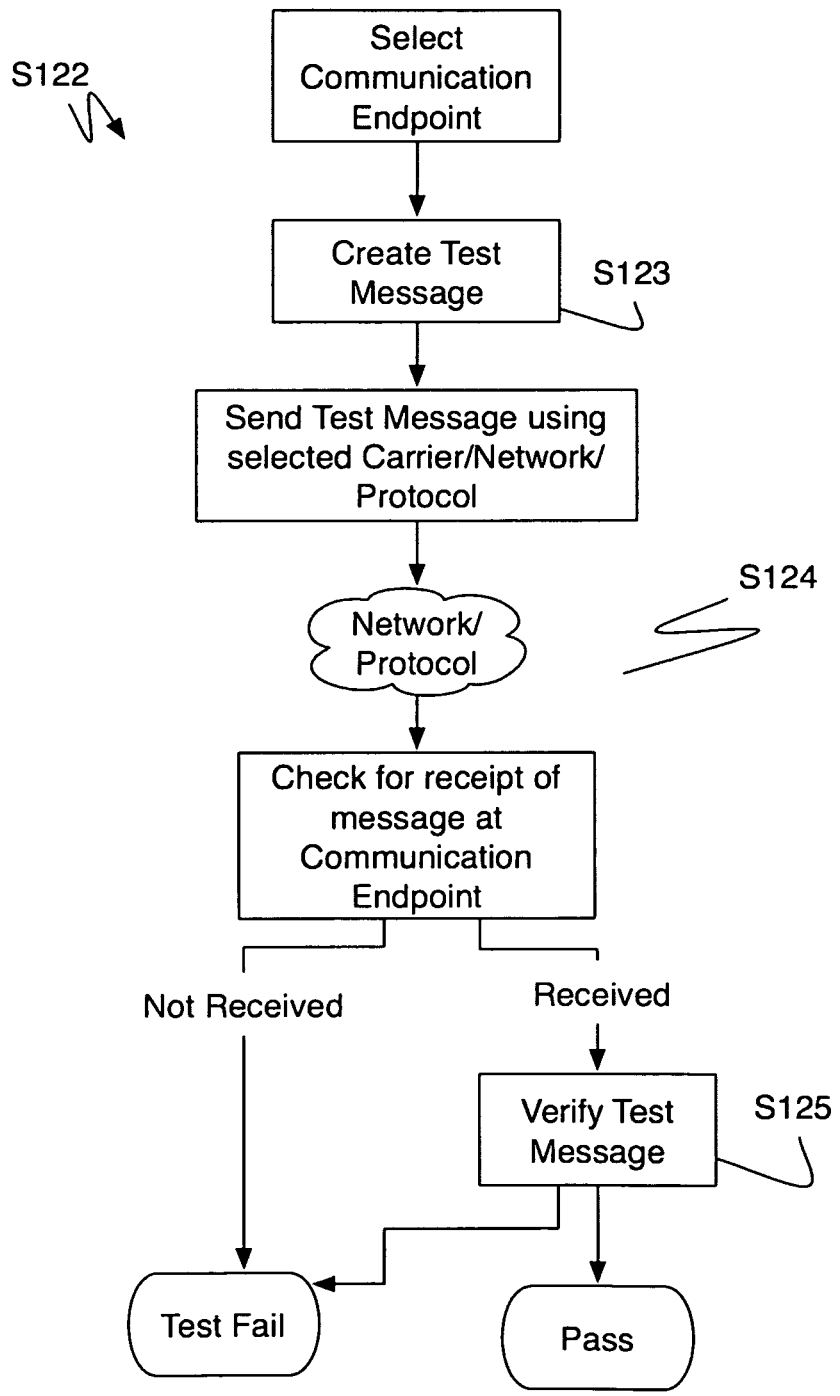
FIGS. 5 and 6 are flow chart representations of preferred embodiments of the invention for testing functionality of communication between an endpoint and a network endpoint of a preferred embodiment of the invention.
Figure 6:
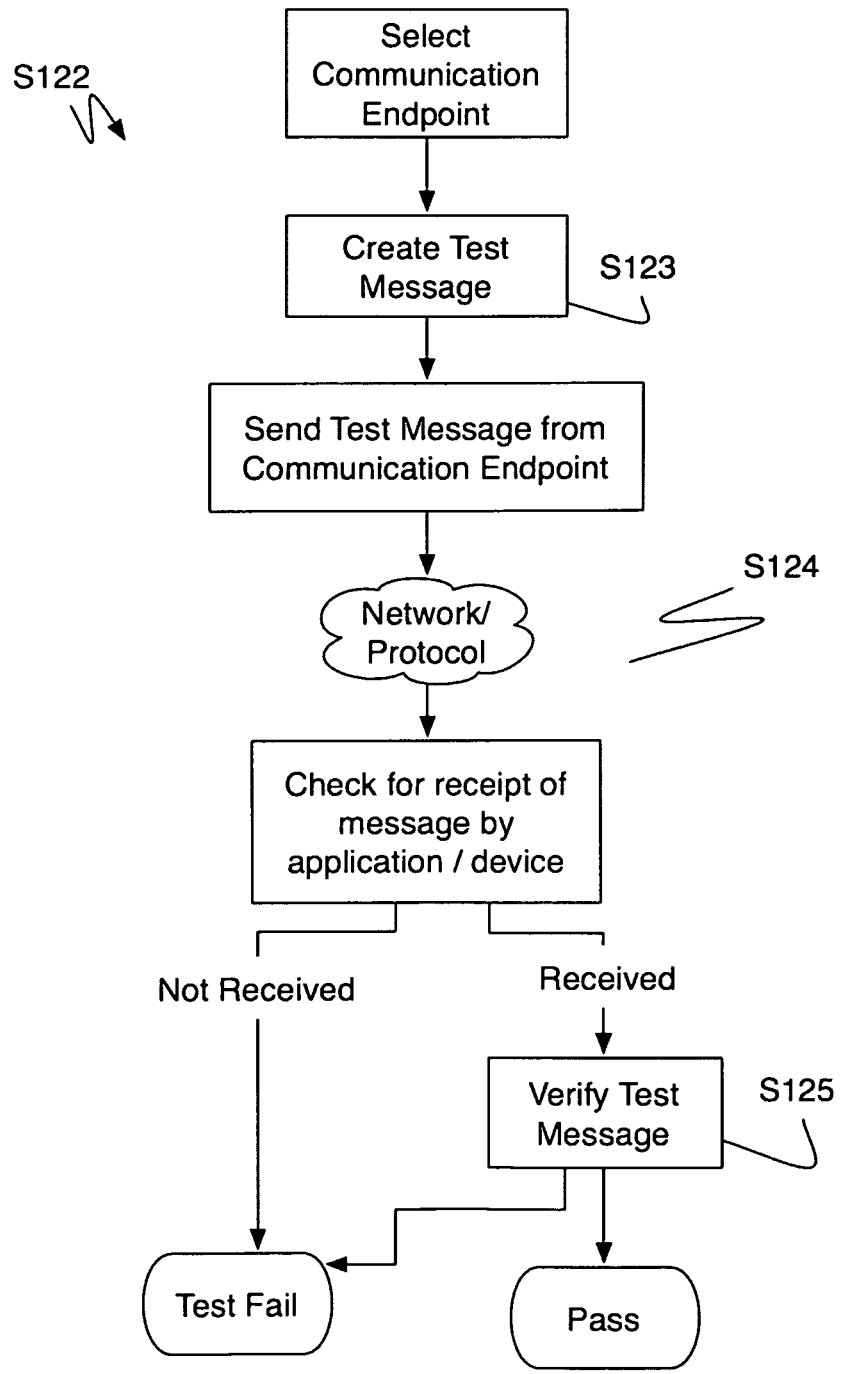

As a second alternative or additional variation, Step S122, which includes testing functionality of communication between the endpoint and a network endpoint, functions to determine if an endpoint works in a variety of scenarios. The endpoint is preferably tested for proper functionality on a plurality of carriers and/or networks and also for a plurality of protocols. In particular situations, an exhaustive test may not be needed. For example, an endpoint may only be used with a particular protocol or within a particular network. As a preferred variation, Step S122 includes creating a test signature S123, sending the test signature between a network and the endpoint address S124, and verifying the test signature S125. The test signature is preferably a unique attribute such as a string included in a communication that can be used verified on a receiver end. In one preferred embodiment a test ID is created and the test signature embodies this test ID either as a separate attribute or encoded into a digital signature. A test ID is preferably any suitable string or identifying code. The string may be unique for each test, a set string, or have any suitable contents. For example, the test ID may have a timestamp encoded into the string. The test signature may be encoded into any suitable medium depending on the type of test. For example, an alphanumeric encoding is suitable for SMS, while an image or video encoding may be suitable for MMS, and an audio encoding may be suitable for voice testing. Additionally, the string may be identifiable as a test message. This may be used to differentiate test ID messages from other messages. A digital signature may be any suitable digital signature suitable for verifying the contents of the message such as a digital signature using public-key cryptography. A network endpoint is preferably a controlled endpoint that is preferably operated by the entity implementing the method but may be any suitable entity. There are preferably at least two variations of Step S124. In a first variation, the test signature is sent from a network to the endpoint, as shown in FIG. 5. In a second variation, the test ID and the signature are sent from the endpoint to the networks, as shown in FIG. 6. These two variations are preferably both performed which functions to test sending and receiving capability. Preferably, a plurality of networks, carriers, and/or protocols are used in a plurality of tests. The parameters of the tests may be targeted to expected use of the endpoint address. For example, for endpoints that will see mobile protocols such as SMS, MMS, voice, etc. CDMA and/or GSM networks are desirable test networks. If the message is received, the test signature is checked to verify the message was properly communicated. The test is preferably passed if the test signature were satisfactorily communicated.

Figure 7:
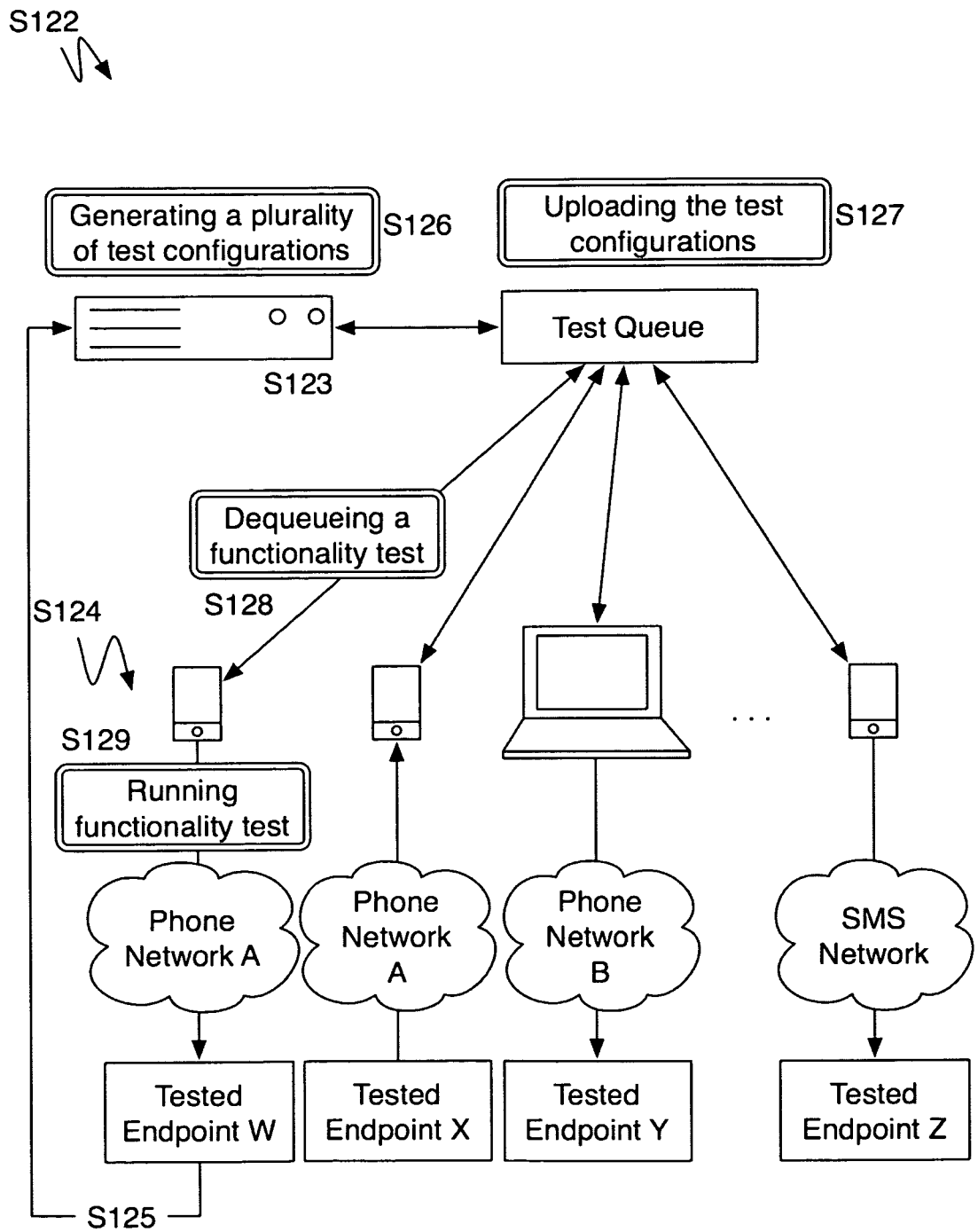
FIG. 7 is a schematic representation of operating a distributed system for testing functionality of communication between an endpoint and a network endpoint of a preferred embodiment of the invention.

As shown in FIG. 7, the testing of an endpoint may include the sub-steps of generating a plurality of functionality test configurations S126; uploading the functionality test configuration to a queue on a hosted resource S127; at least one device dequeuing a functionality test from the hosted resource S128; and running the functionality test configuration S129. The sub-steps S126, S127, S128, and S129 function to enable automated endpoint testing. The steps utilize a system composed, of at least one network accessible resource, and at least one endpoint compatible device to facilitate the communication require for the functionality tests. Preferably, the hosted resource is a server on a cloud hosted platform, and the at least one device being a mobile phone, a laptop, or any suitable device. There are preferably a plurality of mobile devices in communication with the hosted platform. Each device may be setup to test a particular type of communication (e.g., network, protocol, device type, etc). For example, a type of smart phone may use a particular type of network. As another example, a laptop may use a sim card dongle to simulate communication through a particular network. These device may additionally be spatially distributed to facilitate testing geographic impact on functionality. They are preferably continuously running an application, which requests a test configuration from the hosted resource and then participates in the communication. The test configuration preferably includes the endpoint and necessary message to communicate (e.g., the test signature). The mobile devices preferably function as the network endpoints. The mobile devices may be the initiator of a communication or receive a communication originating from the endpoint. Any suitable system may additionally be utilized to facilitate the testing. The results of the functionality test are preferably communicated from the mobile devices back to a central testing system.

Step S130, which includes generating a cleanliness score for the endpoint according to results of the test, functions to calculate at least one metric to assess the quality of an endpoint. The cleanliness score preferably indicates the level of undesired activity that occurs on the endpoint and/or the functionality of the endpoint in various operating conditions. The cleanliness score is preferably a measure of how "clean" the number is but alternatively the score may be more related to the "dirtiness" or any metric relating to activity of a phone number. In other variations the cleanliness score may relate more to the functionality of the endpoint. Additionally, a variety of metrics may be calculated such as wrong number call frequency, time of day patterns of wrong number calls, the location of sources of wrong numbers, ideal networks, functioning protocols, and/or any suitable data or patterns collected in Step S120. The cleanliness score may additionally be based on the probability of predicting that an incoming call properly communicated. Here, "properly communicated" may describe how the communication is successfully delivered and/or that the communication is from a desired source.

In the variation, where a collection of quarantined endpoints is monitored, the system preferably has a high probability of predicting when an incoming communication is a wrong number. For example, if during Step S121 an incoming call from (415) 555-1234 was received multiple times within the time window of 6:00 P.M. to 7:00 P.M., the cleanliness score may be fairly "clean" because such communications can be easily blocked as is described in Step S150 below. However, if a incoming calls are received at random times from random phone numbers then the cleanliness score may by very low since there is low probability of correctly predicting when a call is a wrong number call. The cleanliness score may additionally include categorization of a sources of wrong number communications such as "international number" for phone numbers with frequent international calls, "local number" for phone numbers with predominately local activity, "telephony messaging numbers" for phone numbers receiving SMS or MMS messages, "business hours numbers" for phone numbers with increased activity during business hours, or any suitable label for activity patterns of a phone number. Such label-based scores may be useful for potential owners of a phone number who may have particular requirements for the use of the phone. For example, a local business would often not want to filter local calls, but would be comfortable filtering all international calls. The cleanliness score of a phone number may be used to price a phone number, certify a phone number according to a cleanliness standard, categorize types of phone numbers, or informing past owners of miscalls, or any suitable application.

Figure 8:
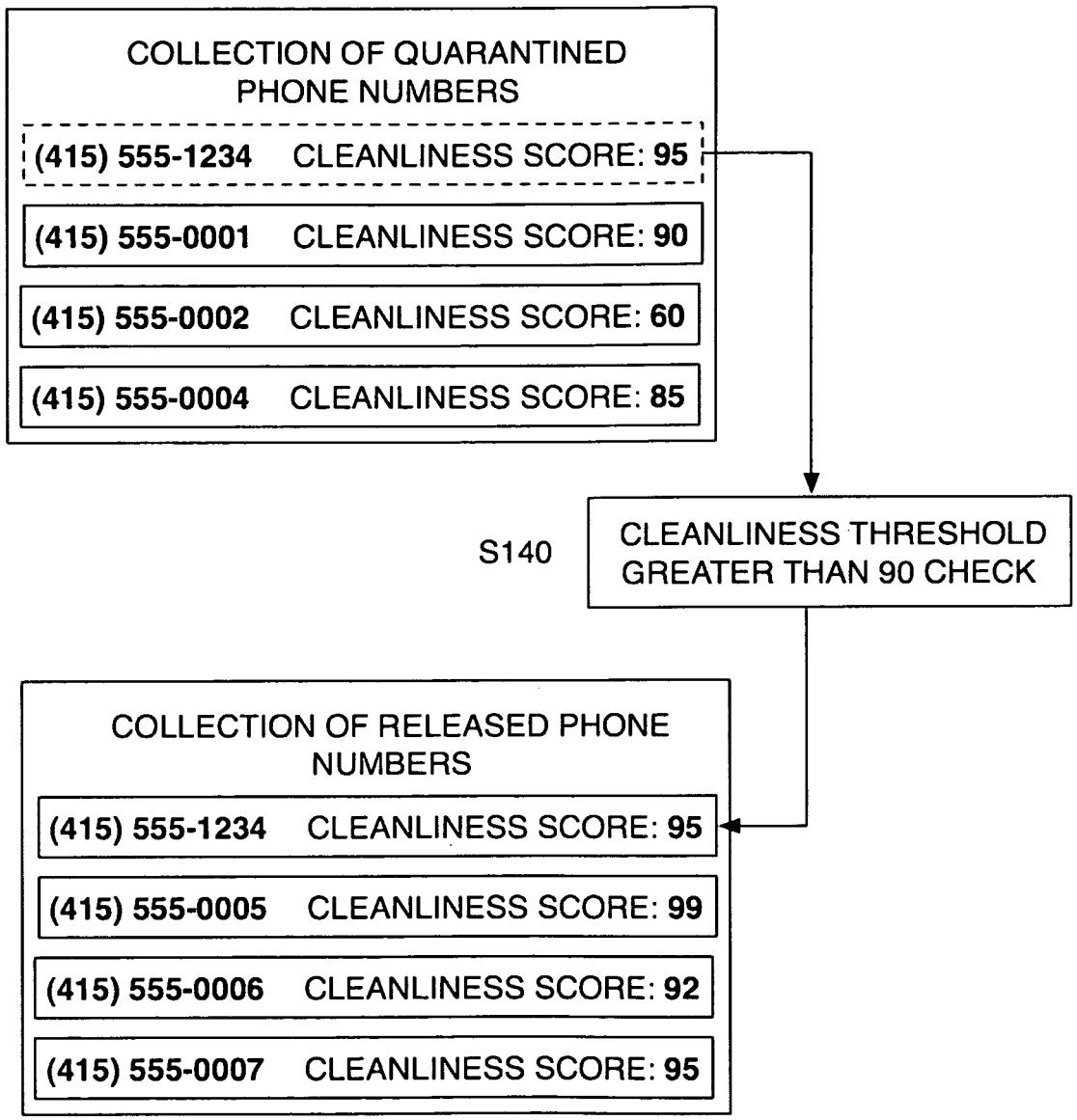
FIG. 8 is a detailed schematic representation of releasing an endpoint of a preferred embodiment of the invention.

Additionally Step S140, which includes releasing the endpoint for distribution according to the cleanliness score, functions to automatically distribute an endpoint when an endpoint is satisfactorily "clean". This step is preferably used in combination with managing a collection of quarantined endpoints. There is preferably a set cleanliness threshold. Over time the activity of quarantined endpoints preferably declines and correspondingly the cleanliness score approaches the cleanliness threshold. The cleanliness threshold is preferably set at a level of activity that would not negatively impact the use of a phone number by a new owner. The threshold may additionally be dependent on the intended use of an endpoint. The cleanliness score may include sub-scores. These sub-scores may be used to determine a categorized use-case. A use-case may include type of use of the number which may be based on the medium of the endpoint and/or applications for the endpoint. Some exemplary use-cases for phone numbers may include categories for a nation-wide number (e.g., little unwanted traffic and few functionality issues within a country), local number (e.g., little unwanted traffic within the city Sand few functionality issues for a particular city), outgoing number (e.g., ideal for making outgoing calls), incoming number (e.g., ideal for mostly receiving calls), voice number (e.g., for use with voice calls), SMS numbers (e.g., for text messaging), and/or any suitable use-case. Categorizing endpoints into use-cases preferably enables endpoints with potentially unsuitable cleanliness scores be used in ways that preferably leverage the satisfactory aspects of the endpoint. Once a threshold is satisfied, the endpoint may be assigned to a collection of available phone numbers (i.e., set to a released state), as shown in FIG. 8. Alternatively, there may be various levels of being released. For example, an endpoint may be released for telephony messaging if the endpoint address passes SMS or MMS messaging tests in Step S120 even if the endpoint may have failed a voice communication test. Endpoint addresses that do not pass a test may be retested. The cleanliness score information of a particular endpoint may additionally remain as an attribute of the endpoint such that potential owners of an endpoint can be informed of how "dirty" an endpoint may be. For example, it may be useful for a user to first review the amount of wrong number communications that can be expected from any particular phone number or network/protocol errors that may be associated with that particular endpoint. Additionally, the error may be automatically reported to a proper entity such as a carrier or service provider. The carrier or service provider may be able to take proper action to correct the problem. Alternatively, an endpoint address may be discarded and no longer maintained. This may involve returning the number to the carrier or blacklisting the endpoint. The endpoint is preferably assigned (i.e., distributed) to an application, service, and/or device. By assigning a communication endpoint to an application, service, and/or device incoming messages are preferably routed to the application, service, and/or device. The communication endpoint is preferably additionally used as an identifier for outgoing communication from the application, service, and/or device. An application programming interface (API) may used to facilitate the distribution of a provisioned communication endpoint.

Figure 9:
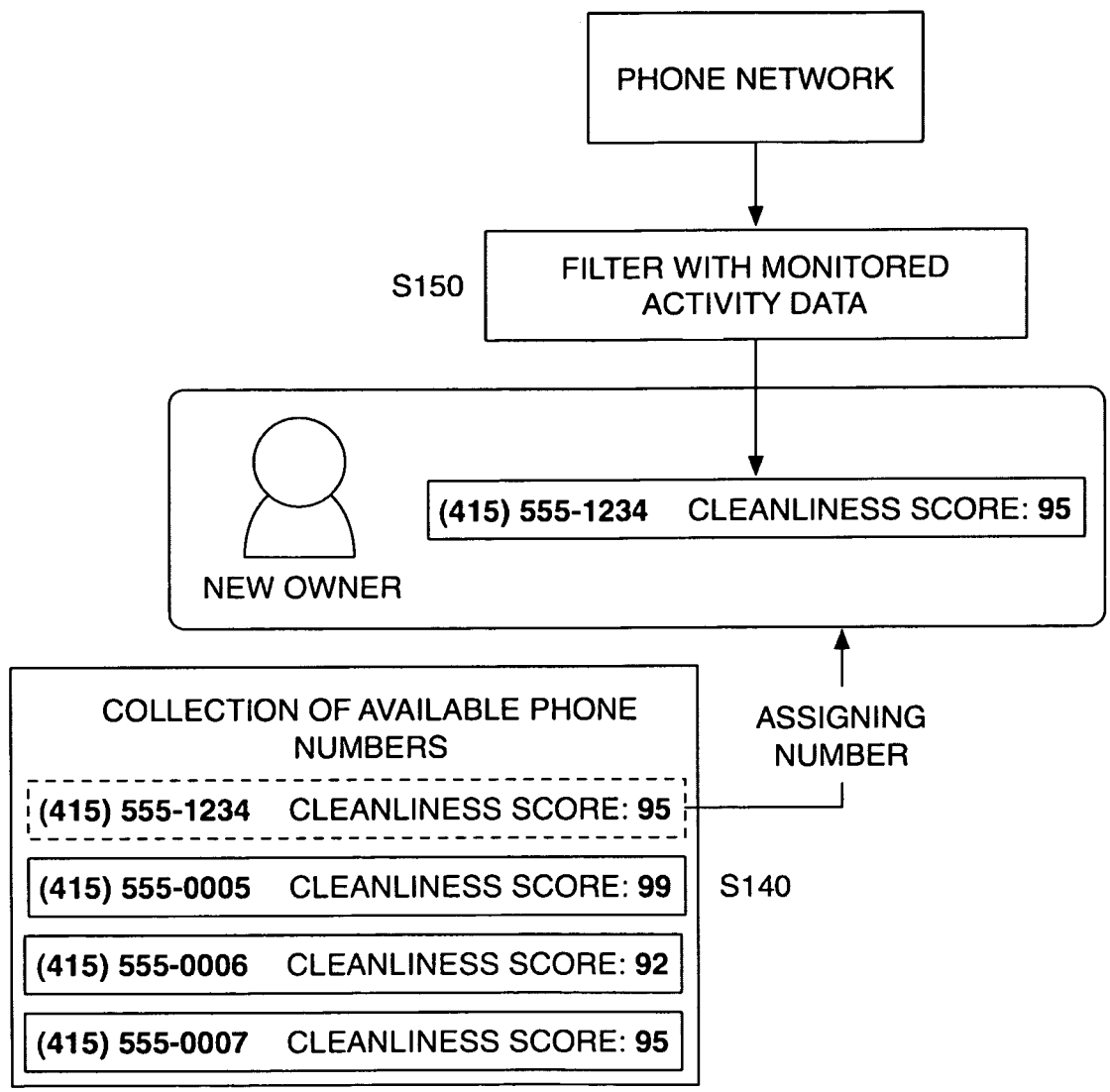
FIG. 9 is a detailed schematic representation of filtering communications of a preferred embodiment of the invention.

Additionally or alternatively, Step S150, which includes filtering communication to a distributed endpoint according to the monitored activity, functions to actively prevent wrong endpoint communications from occurring. As shown in FIG. 9, a filter preferably works as an intermediary, enforcing rules when directing incoming communication requests to a phone number. The filter preferably allows a request or blocks the request, but may additionally perform other actions such as mediating a connection, informing a third party (preferably a previous owner) of the miscall, or any suitable action. As described above, a blacklist may be used to determine what communications are blocked or specifically handled. In one example, phone numbers that repeatedly call a particular phone number when in quarantine are added to the blacklist of numbers for that phone number. The blocked phone numbers are preferably prevented from connecting to a new owner of the particular phone number. When filtering an incoming communication a plurality of actions may be performed. In one variation, an out of service phone number message or a fast busy signal is played to a blocked number when a call is made from the blocked number. As an additional variation, an automated telephone service preferably intercepts the incoming call and creates a second connection with the new owner of the endpoint. Once the user of the phone number answers, the automated telephone service preferably provides a variety of options including accepting the call, ignoring the call one time, ignoring the time from now on, leaving a message for the caller, or any suitable response. Alternatively, answering options may be provided for SMS, MMS and any suitable endpoints. Additionally, the method may include blocking calls according to patterns detected during Step S120 such as phone calls from a particular area code or phone calls during a particular time of day. The filtering of communication is preferably additionally customizable by the owner of an endpoint. When receiving a new endpoint, the new owner is preferably presented with filtering options such as numbers to block and rules for blocking. An endpoint may be cycled through the collection of quarantined endpoints multiple times over the lifetime of an endpoint. The filters for an endpoint may additionally be persistent and be used for the lifetime of an endpoint or alternatively be reset when an endpoint is given up and added to the collection of quarantined endpoints. Similarly, the activity of an endpoint may continue to be monitored during the use of an endpoint, and a filter may be removed according to the activity of an endpoint.

Figure 10:
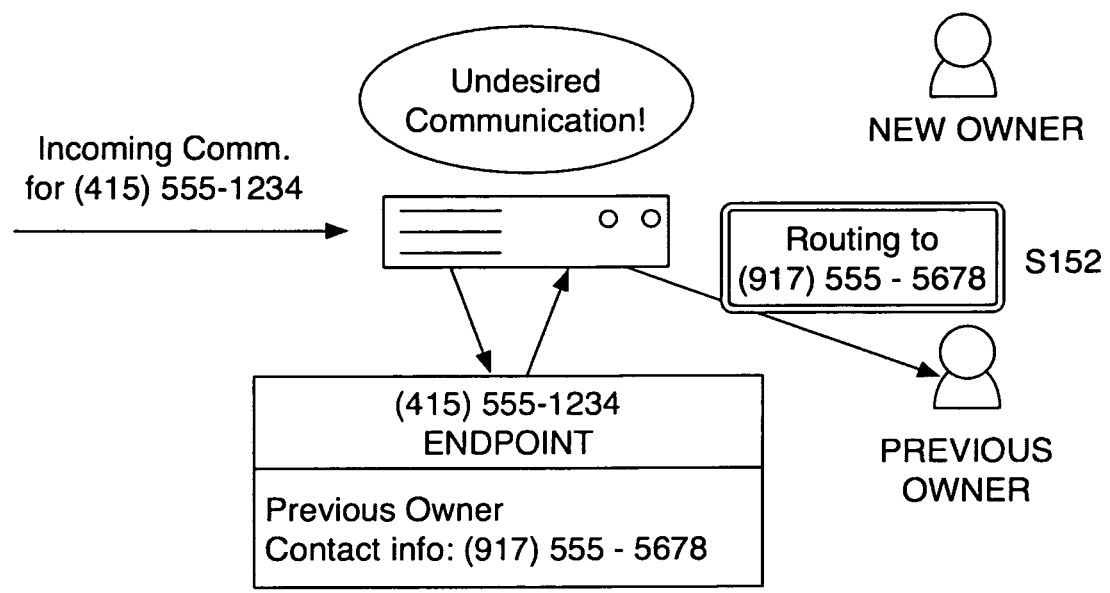
FIG. 10 is a schematic representation of routing communication to a second user of a preferred embodiment of the invention.

Additionally, a sub-step of filtering communication may include routing the communication to a second user S152, which functions to redirect a communication to another user of an endpoint. This sub-step may be used for redirecting calls intended for a previous owner of an endpoint as shown in FIG. 10. In a variation where contact information of a previous owner of the endpoint has been stored, the contact information is preferably provided to a blocked caller/messenger through the automated telephone service or the caller may be redirected to a permanent phone number left by the previous owner. The monitored activity over the cumulative history of the endpoint may additionally be used to appropriately redirect incoming communications to an appropriate previous user of the endpoint. This sub-step has the benefit of being optionally extended for simultaneous use of an endpoint by multiple users. In cases where an endpoint has a well-defined desired incoming communications, multiple entities may share the endpoint concurrently. Incoming communications are preferably routed to an appropriate entity according to desired activity set for an entity. The entities that concurrently share the endpoint preferably use the endpoint for incoming communications with distinct attributes. These distinct attributes may be geographic, content, network based, protocol based, or rely on any suitable attribute. Preferably geographic attributes of incoming messages are used for routing incoming communications. For example, a phone number may be used for local use in city A by one entity and for local use in a city B by a second entity. Preferably, city A and city B are far apart such that incoming communications may be properly filtered. Similarly, the concurrent usage may be divided and routed based on communication type (e.g., whether an SMS message, voice session, email, etc.). So one entity may use an endpoint for SMS services while a second entity uses the endpoint for voice sessions.

An alternative embodiment preferably implements the above methods in a computer-readable medium storing computer-readable instructions. The instructions are preferably executed by computer-executable components preferably integrated with a endpoint hosting platform. In one preferred embodiment, an internet-telephony platform is coupled to an endpoint The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for providing clean endpoints comprising:
    managing a collection of endpoints;
    testing communication of an endpoint of the collection of endpoints, wherein testing communication of the endpoint includes monitoring incoming communication activity of the endpoint and identifying undesired communication activity patterns; and
    generating a cleanliness score for the endpoint according to results of the test.

2. The method of claim 1, wherein endpoints are globally namespaced.

3. The method of claim 1, wherein the endpoints are phone numbers.

4. The method of claim 1, wherein testing communication of the endpoint includes testing periodically over a duration of time.

5. The method of claim 4, wherein managing the collection of endpoints includes managing a collection of quarantined endpoints; and further comprising releasing the endpoint for distribution according to the cleanliness score.

6. The method of claim 5, wherein the collection of endpoints includes phone numbers.

7. The method of claim 6, wherein identifying undesired communication activity patterns includes determining temporal patterns of communication.

8. The method of claim 6, wherein identifying undesired communication activity patterns includes determining incoming communication origin patterns.

9. The method of claim 6, wherein identifying undesired communication activity patterns is achieved by receiving a signal from an assigned user of the endpoint that an instance of communication is undesired.

10. The method of claim 6, further comprising filtering incoming communication based on attributes of the communication and identified undesired communication activity patterns.

11. The method of claim 10, wherein a dynamic blacklist of communication origins is created from the identified undesired communication activity patterns and wherein the communication origins in the dynamic blacklist are filtered.

12. The method of claim 10, wherein filtering incoming communications further includes routing an incoming communication to a second user, wherein the second user is a previous owner.

13. The method of claim 10, wherein filtering incoming communications further includes routing an incoming communication to a second user, wherein the second user concurrently uses the endpoint for communications with attributes distinct from a first user.

14. The method of claim 6, wherein releasing the endpoint for distribution according to the cleanliness score includes making the endpoint available for assignment upon satisfying a cleanliness score threshold.

15. The method of claim 6, wherein releasing the endpoint for distribution includes correlating a price to the cleanliness score of the endpoint.

16. The method of claim 6, wherein the cleanliness score includes use-case sub-scores and wherein releasing the endpoint for distribution includes releasing the endpoint for at least one categorized use-case according to the use-case cleanliness sub-score.

17. The method of claim 6, further comprising filtering incoming communication to the released endpoint based on attributes of the incoming communication and identified undesired communication activity patterns.

18. The method of claim 17, wherein testing communication of the endpoint includes testing functionality of communication between the endpoint and a network endpoint comprising the steps of creating a test signature; sending the test signature between a network endpoint and the endpoint; and verifying the test signature.

19. The method of claim 5, wherein testing communication of the endpoint includes testing functionality of communication between the endpoint and a network endpoint comprising the steps of creating a test signature; sending the test signature between a network endpoint and the endpoint; and verifying the test signature.

20. The method of claim 19, wherein the endpoints are phone numbers.

21. A method for providing clean endpoints comprising: managing a collection of endpoints; testing communication of an endpoint of the collection of endpoints, wherein testing communication of the endpoint includes testing functionality of communication between the endpoint and a network endpoint comprising the steps of creating a test signature; sending the test signature between a network endpoint and the endpoint; and verifying the test signature; and
generating a functionality score for the endpoint according to results of the test.

22. The method of claim 21, wherein the endpoint is a phone number.

23. The method of claim 22, wherein testing functionality of the endpoint includes testing functionality of communication between the endpoint and a plurality of network endpoints wherein testing functionality is performed on a plurality of communication protocols.

24. The method of claim 22, wherein sending the test signature is sent from the endpoint to the network endpoint.

25. The method of claim 22, wherein sending the test signature is sent from the network endpoint to the endpoint.

26. The method of claim 22, wherein testing functionality of communication between the endpoint and a network endpoint includes generating a plurality of functionality tests configurations; uploading the functionality test configurations to a queue on a hosted resource; at least one device dequeuing a functionality test from the hosted resource; and running the functionality test configuration from the at least one device.

27. The method of claim 26, wherein network, protocol, and network endpoint attributes of the at least one device are customized for a functionality test.

28. The method of claim 21, wherein testing communication of the endpoint includes monitoring incoming communication activity of the endpoint and identifying undesired communication activity patterns.

* * * * *